United States Patent
Paul et al.

(10) Patent No.: US 7,218,636 B2
(45) Date of Patent: May 15, 2007

(54) METHOD AND APPARATUS FOR RENDERING A CELL-BASED SWITCH USEFUL FOR FRAME BASED APPLICATION PROTOCOLS

(75) Inventors: Harry V. Paul, Haddonfield, NJ (US); Richard Branco, Westmont, NJ (US); Jereld W. Pearson, Somerdale, NJ (US); Gregory L. Koellner, Medford, NJ (US)

(73) Assignee: Inrange Technology Corporation, Lumberton, NJ (US)

( * ) Notice: Subject to any disclaimer, the term of this patent is extended or adjusted under 35 U.S.C. 154(b) by 853 days.

(21) Appl. No.: 09/995,605

(22) Filed: Nov. 29, 2001

(65) Prior Publication Data

US 2002/0191615 A1    Dec. 19, 2002

Related U.S. Application Data

(60) Provisional application No. 60/297,454, filed on Jun. 13, 2001.

(51) Int. Cl.
*H04L 12/28* (2006.01)
*H04Q 11/04* (2006.01)

(52) U.S. Cl. ............... 370/395.1; 370/397; 370/470

(58) Field of Classification Search ........... 370/229, 370/360, 389, 352, 395.1, 469, 470, 463, 370/537, 474, 545, 397, 392; 340/2.2, 2.23, 340/2.1; 710/33, 317, 412
See application file for complete search history.

(56) References Cited

U.S. PATENT DOCUMENTS

| 5,974,467 | A | | 10/1999 | Haddock et al. ............ 709/240 |
| 6,138,185 | A | * | 10/2000 | Nelson et al. ................ 710/33 |
| 6,148,004 | A | * | 11/2000 | Nelson et al. .............. 370/463 |
| 6,810,046 | B2 | * | 10/2004 | Abbas et al. ................ 370/545 |
| 2001/0012188 | A1 | * | 8/2001 | Hasegawa et al. ..... 360/324.12 |
| 2001/0012288 | A1 | * | 8/2001 | Yu .............................. 370/352 |

FOREIGN PATENT DOCUMENTS

EP    0 856 969    8/1998

* cited by examiner

*Primary Examiner*—Afsar Qureshi
(74) *Attorney, Agent, or Firm*—Beck & Tysver PLLC

(57) ABSTRACT

A method for providing an early packet termination such that prior to the complete transmission of the number of cells specified in the first cell of a packet, a crossbar connection is released. The act of releasing the connection is triggered on recognition of an End of Packet bit (EOP) set in any cell of the stream. The feature can be enabled, for example, by a specific act of setting a register bit, connecting a pin to Vcc or ground or some other intentional act. The feature will default to the inactive state upon reset.

12 Claims, 4 Drawing Sheets

IMPROVEMENT

METHOD AND APPARATUS FOR RENDERING A CELL-BASED SWITCH USEFUL FOR FRAME BASED APPLICATION PROTOCOLS

PRIORITY

This application claims priority to the provisional U.S. patent application entitled, Method and Apparatus for Rendering a Cell-Based Switch Useful for Frame Based Application Protocols, filed Jun. 13, 2001, having a Ser. No. 60/297,454, the disclosure of which is hereby incorporated by reference.

FIELD OF THE INVENTION

The present invention relates generally to products and methods that are capable of reducing latency in switches, and in particular, in switch fabrics that are adaptable for use with fibre channel protocols and other Storage Area Network (SAN) protocols.

BACKGROUND OF THE INVENTION

Mainframes, super computers, mass storage systems, workstations and very high-resolution display subsystems are frequently connected together to facilitate file and print sharing. Common networks and channels used for these types of connections oftentimes introduce communications bottle necking, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions.

One type of communications interconnect that has been developed is fibre channel (FC). The fibre channel protocol was developed and adopted by the American National Standards Institute (ANSI). See, e.g., Fibre Channel Physical and Signaling Interface, Revision 4.3, ANSI (1994) for a detailed discussion of the fibre channel standard. Briefly, fibre channel is a switched protocol that allows concurrent communication among workstations, super computers and various peripherals. The total network bandwidth provided by fibre channel is on the order of a terabit per second. Fibre channel is capable of full-duplex transmission of frames at rates exceeding 1 gigabit per second. It is also able to transport commands and data according to existing protocols such as Internet protocol (IP), Small Computer System Interface (SCSI), High Performance Parallel Interface (HIPPI) and Intelligent Peripheral Interface (IPI) over both optical fibre and copper cable.

The fibre channel industry indicates that the information explosion and the need for high-performance communications for server-to-storage and server-to-server networking have been the focus of much attention during the 90s. Performance improvements in storage, processors, and workstations, along with the move to distributed architectures such as client/server, have spawned increasingly data-intensive and high-speed networking applications. The interconnect between these systems and their input/output devices demands a new level of performance in reliability, speed, and distance. Fibre channel, a highly-reliable, gigabit interconnect technology allows concurrent communications among workstations, mainframes, servers, data storage systems, and other peripherals using SCSI and IP protocols. It provides interconnect systems for multiple topologies that can scale to a total system bandwidth on the order of a terabit per second. Fibre channel delivers a new level of reliability and throughput. Switches, hubs, storage systems, storage devices, and adapters are among the products that are on the market today, providing the ability to implement a total system solution.

Information Technology (IT) systems frequently support two or more interfaces, and sharing a port and media makes sense. This reduces hardware costs and the size of the system, since fewer parts are needed. Fibre channel, a family of ANSI standards, is a common, efficient transport system supporting multiple protocols or raw data using native fibre channel guaranteed delivery services. Profiles define interoperable standards for using fibre channel for different protocols or applications.

Fibre channel, a channel/network standard, contains network features that provide the required connectivity, distance, and protocol multiplexing. It also supports traditional channel features for simplicity, repeatable performance, and guaranteed delivery. Fibre channel also works as a generic transport mechanism.

Fibre channel architecture represents a true channel/network integration with an active, intelligent interconnection among devices. A fibre channel port provides management of a simple point-to-point connection. The transmission is isolated from the control protocol, so that point-to-point links, arbitrated loops, and switched topologies are used to meet the specific needs of an application. The fabric is self-managing. Nodes do not need station management, which greatly simplifies implementation.

FIG. 1 illustrates a variable-length frame 11 as described by the fibre channel standard. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. A field of variable-length data 16 follows the header 14. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

FIG. 2 illustrates a block diagram of a representative fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e., fibre channel switch). The fabric 110 is an entity that interconnects various node-ports (N-ports) 140 and their associated workstations, mainframes and peripherals attached to the fabric 110 through the F-ports 142. The essential function of the fabric 110 is to receive frames of data from a source N-port and, using a first protocol, route the frames to a destination N-port. In a preferred embodiment, the first protocol is the fibre channel protocol.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," or fibre channel switch to connect devices. The fabric includes a plurality of fabric-ports (F-ports) that provide for interconnection and frame transfer between a plurality of node-ports (N-ports) attached to associated devices that may include workstations, super computers and/or peripherals. The fabric has the capability of routing frames based upon information contained within the frames. The N-port manages the simple point-to-point connection between itself and the fabric. The type of N-port and associated device dictates the rate that the N-port transmits and receives data to and from the fabric. Transmission is isolated from the control protocol so that different topologies (e.g., point-to-point links, rings, multidrop buses, cross point switches) can be implemented.

Switch fabrics that support protocols such as fibre channel are generally frame-based and of variable length such that data processing and transfer can be conducted as described, for example in FIGS. 1 and 2 described above. However, there are also switch fabrics that are cell-based that include fixed length data "packets" such as that described for example in U.S. Pat. No. 5,781,549, the content of which is incorporated herein by reference in its entirety. Cell-based fixed length switches are often utilized for WAN and ATM applications due to their adaptability for the same. Cell-based switches often are associated with a high-speed network interface. This may be used for a high-speed port, such as an ATM port or other high-speed protocol connection. The '549 patent describes a packet switch wherein variable length Ethernet frames are segmented into cells for fixed length cell switching. The cells are then reassembled into the original frame before exiting the switch. Once the frame has been segmented into cells, the cells can be sent through the switch to the destination port where the cells are reassembled into the original Ethernet frame format.

For example, the '549 switch provides a certain number of Ethernet ports and a high-speed network interface. The Ethernet ports are grouped into sets of ports, each set being associated with a packet processing unit. The packet processing units are responsible for receiving Ethernet packets, segmenting them into fixed-size cells and conveying them on a backplane cell bus incorporated within the work group switch.

Each packet processing unit in the switch has associated with it a packet buffer memory. Each packet processing unit monitors traffic on the cell bus and collects all the cells transmitted thereon for reassembly into Ethernet packets in the packet buffer memory. The packet buffer memory is a shared memory to the extent that it relates to the group of eight ports associated with a single packet processing unit, however the packet buffer memories are distributed to the extent that there is one dedicated for each of the packet processing units. Each received Ethernet packet is reassembled in each packet buffer memory because the destination port for the received packet may be one or several ports associated with one or several of the packet processing units.

Also coupled to the cell bus is a switch packet routing controller which monitors cell traffic on the cell bus. For each packet that is received, the switch packet routing controller analyzes the packet to determine which ports, if any, the packet is to be output from. The switch packet routing controller propagates a control cell on the cell bus directing each of the packet processing units how to "route" each packet being assembled thereby. The switch packet routing controller also has associated therewith a routing table memory that collects information on received packets for creating a routing table associating each port with addresses to which it is in communication.

While cell-based switches can be used successfully in WAN and ATM type of applications, use of such switch fabrics can be problematic when the same are connected to frame-based protocols such as Fibre Channel or other SAN applications. Namely, in Fibre Channel frames, the header contains routing information, but no length info. Length is determined by the EOF primitive at the end of the frame, and can be, for example, from 36 to 2148 bytes. The switch does not really parse any higher level protocol, so does not look for lengths that might be embedded in the payload. If an entire FC frame is buffered to determine the frame (i.e., packet) length to insert into the first cell prior to transmission of the frame, the latency would be undesirable (for example ~20 μs @ 1 Gbps). Thus, it has been difficult to use cell-based switch fabrics for Fibre Channel and other similar protocols since the entire Ethernet frame must be received and buffered before segmentation may take place. Moreover, Fibre Channel protocol (and other frame based protocols) typically do not include frame length explicitly. In a crossbar based frame switch, connection duration typically must be specified at the time a connection is established. This creates problems when the two fabrics are utilized together.

SUMMARY OF THE INVENTION

In accordance with these and other objects, there is provided a method providing an early packet termination such that prior to the complete transmission of the number of cells specified in the first cell of a packet, a crossbar connection is released. The act of releasing the connection is triggered on recognition of an End of Packet bit (EOP) set in any cell of the stream. The feature can be enabled, for example, by a specific act of setting a register bit, connecting a pin to Vcc or ground or some other intentional act. The feature will default to the inactive state upon reset.

In further accordance with the present invention, the number of valid bytes in each cell is calculated, and that number is placed within each cell at a fixed location. The EOP indicator is placed at a fixed location within each cell, and is asserted for the last cell of a packet, or for the cell following the last cell of a packet. The present method permits, inter alia, low-latency routing from FC-port to FC-port, and scalability from 32, up to even 512 2 Gbps FC ports. The capability for expansion is believed to be especially important in the case of storage area networks.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

In accordance with the present invention, there is provided a method and associated apparatus for decomposing a packet into N single-cell packets, and programming the packet length for a maximum frame-based protocol (i.e., Fibre Channel) frame size, and using an "end of packet bit" ("EOP") in the cell header to signal the end of the packet if it was shorter than the programmed length ("early packet termination"). It should be understood that other protocols, such as the asynchronous transfer mode (ATM) could be used without departing from the scope of the present invention. In a broad sense, the present invention provides that a packet is decomposed into N single-cell packets and the packet length is programmed for a maximum Fibre Channel frame size using an end of packet (EOP) bit in a cell header to signal the end of the packet if it was shorter than the programmed length (hereinafter referred to as "early packet termination")

Existing methods for sending a collection of fixed length cells, or packet, through a cell-based switch typically require that the number of cells in the packet be known before the packet is sent. That number ("n"), must be stamped on the header in every cell in the packet. The cell-based switch uses this information to break the connection through the fabric once the packet transmission has been completed. It is possible to buffer an entire Fibre Channel frame, count the number of bytes in the frame, and calculate how many cells will be necessary to accommodate all of the information in the Fibre Channel frame before sending the packet through the switch fabric. However, such a methodology may introduce unacceptable latency into the transmission time of the frame.

Figure 1:
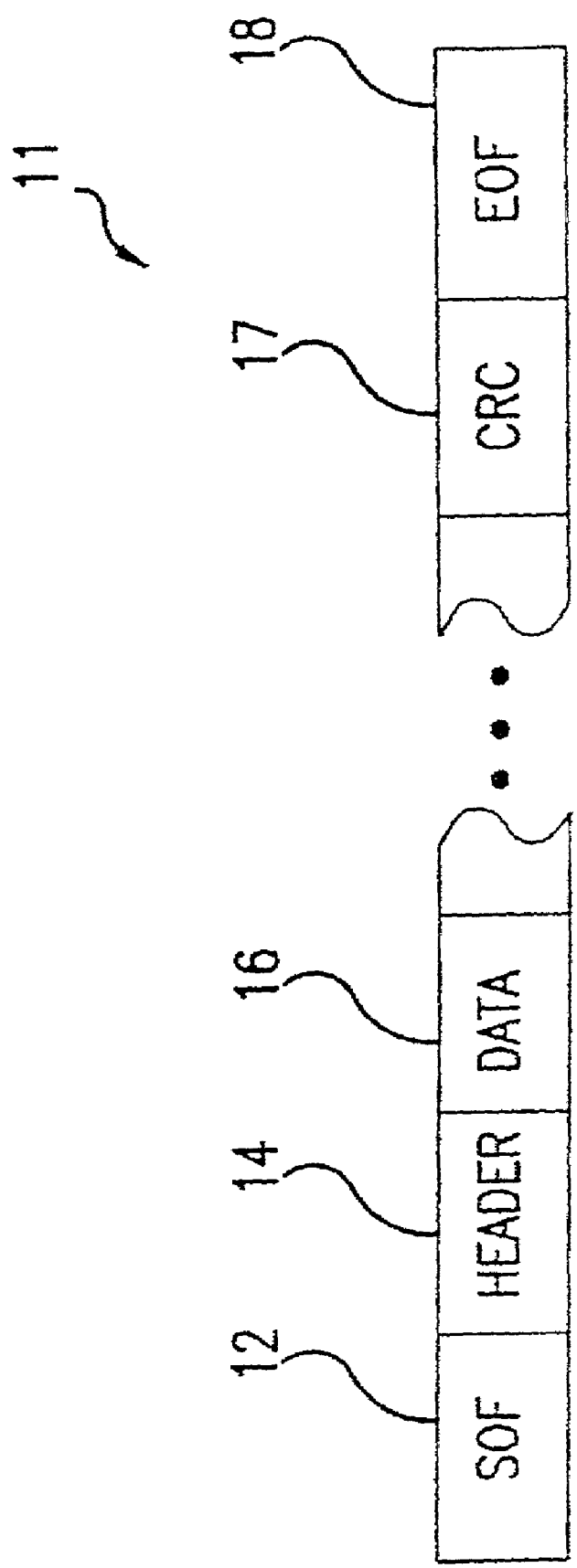
FIG. 1 illustrates a variable-length frame as described by the fibre channel standard.
Figure 2:
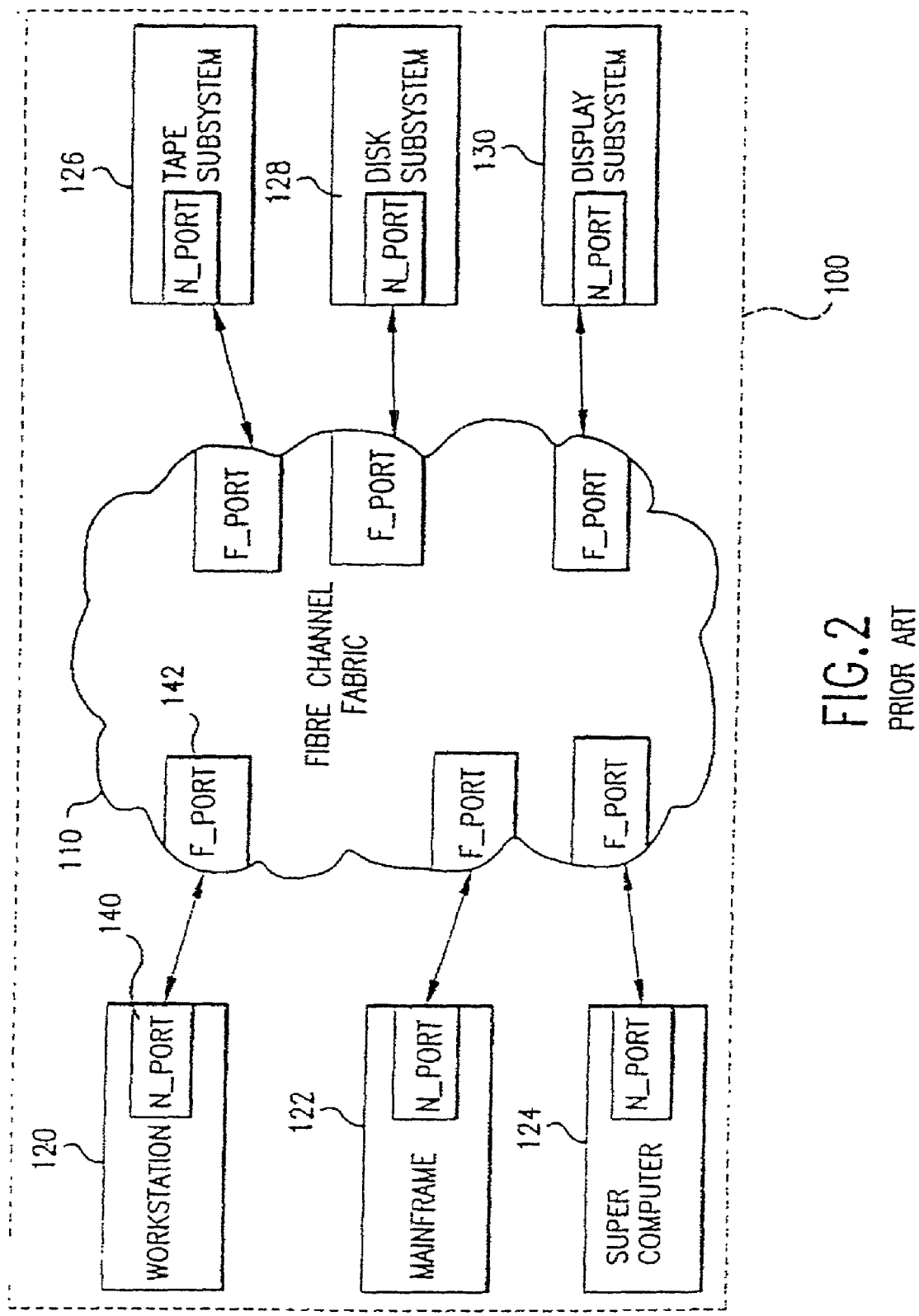
FIG. 2 illustrates a block diagram of a representative fibre channel architecture in a fibre channel network.
Figure 3A:
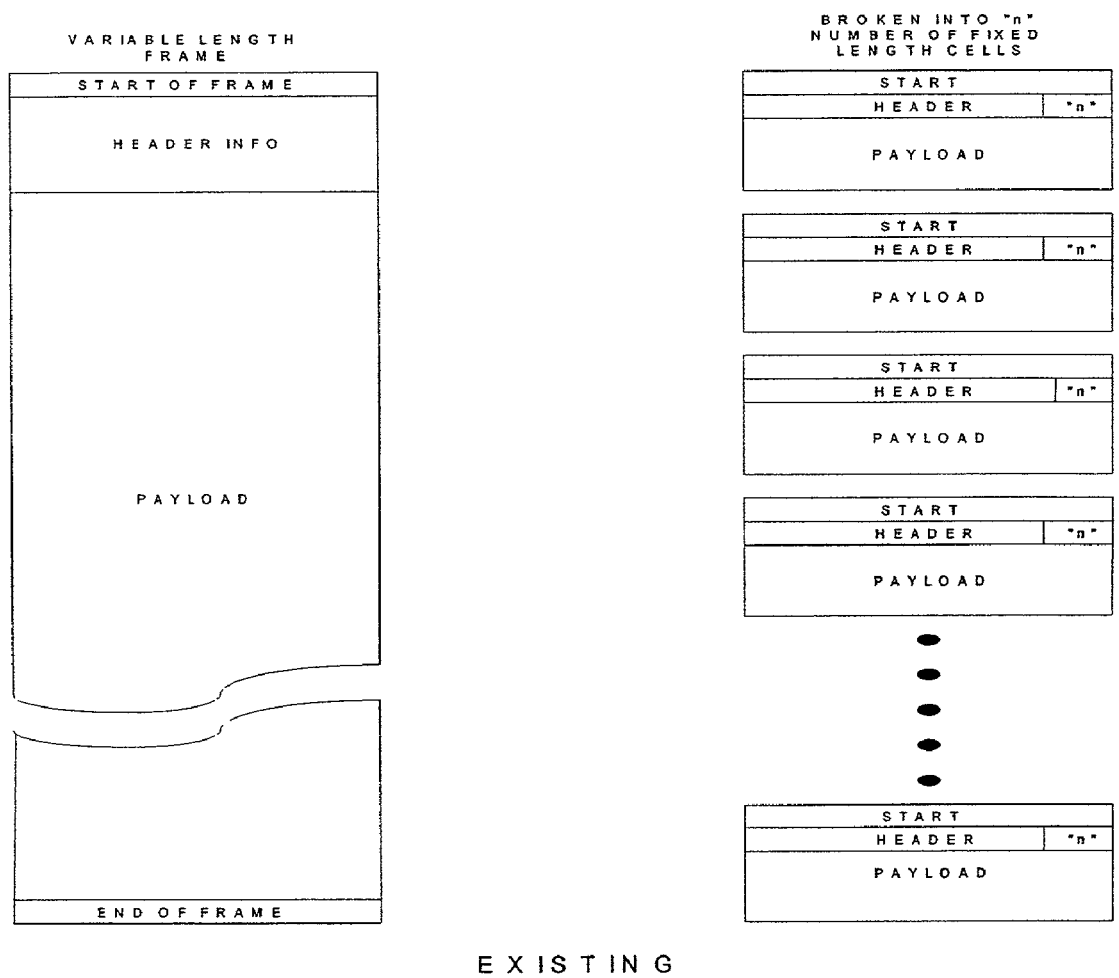
FIGS. 3A and 3B illustrate a typical variable length frame as well as an improved arrangement according to the present invention.
Figure 3B:
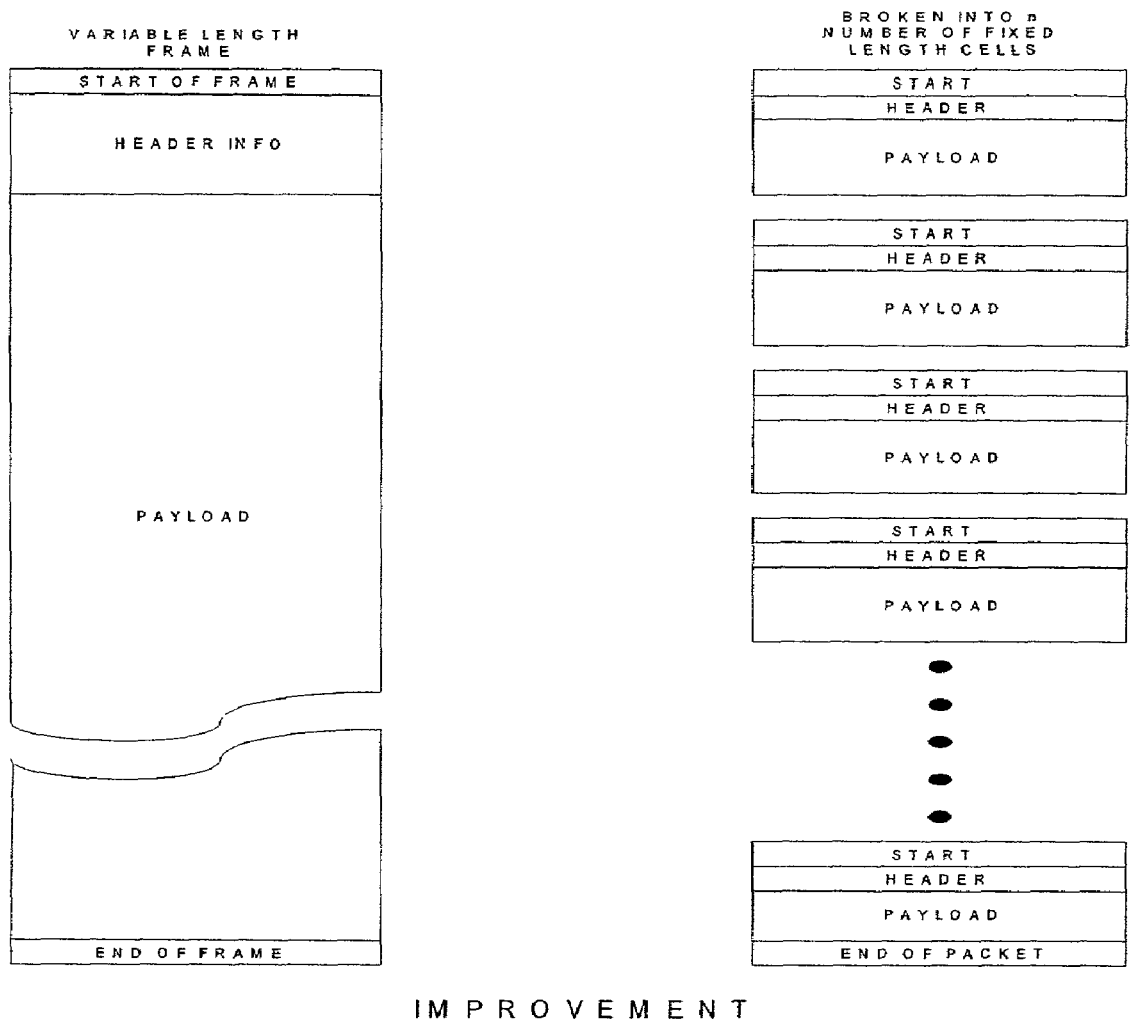

FIG. 3 illustrates a typical variable length frame as well as an improved arrangement for reducing switch latency according to the present invention.

In Fibre Channel Applications, a transmit latency of no more than one or two microseconds is highly desirable. The cell-based switch requires that the first cell of every packet (frame) indicate the number of cells in that packet. However, Fibre Channel headers (and headers for other frame-based protocols) do not specify frame length. The length of the frame is not known until the EOF marker is received. Therefore, it seems as if the entire frame must be buffered before the first cell of the packet is transmitted. This buffering produces unacceptably high latency (~20 μs at 1 Gbps data rate).

In accordance with the present invention, a number of alternative embodiments are contemplated to address this problem. In some embodiments, the maximum packet length is inserted into the first cell of the packet, and the first cell of the packet is transmitted into the switch. The remaining cells of the packet are transmitted into the switch, as they become available. When the EOF marker is received, the true length of the packet is known. The EOP indicator is asserted in the last cell of the packet, or in the cell following the last cell of the packet.

Each cell contains a field to hold a valid byte count for that cell. Each cell also contains an EOP field, which is asserted when that cell is the last cell of a packet, and disasserted when that cell is not the last cell of a packet. These fields occur at the same position within every cell. At the switch input, the contents of a cell's valid byte count and EOP indicator fields cannot be calculated until entire cell has been received.

If the valid byte count and EOP indicator fields are located at the beginning of each cell, each cell must be buffered at the switch input. After the entire cell has been buffered, the valid byte count and EOP indicator for that cell are calculated and placed in the fields at the beginning of the cell. Then the cell is transmitted into the switch. At the switch output, the valid byte count and EOP indicator fields are available at the beginning of the cell, and no output buffering is required.

If the valid byte count and EOP indicator fields are located at the end of each cell, no buffering at the switch input is required. The beginning of the cell is transmitted to the switch as soon as it is available. While the cell is entering the switch, the valid byte count and EOP indicator for that cell are calculated. As the end of the cell enters the switch, the valid byte count and EOP indicator are placed in the fields at the end of the cell. However, at the switch output, the entire cell must be buffered. After the entire cell has been buffered at the switch output, the valid byte count and EOP indicator are extracted from the fields at the end of the cell. Then, cell's payload data can be extracted.

The preceding three paragraphs demonstrate that segmenting variable-length frames into fixed-length cells results in a latency of one cell, rather than a latency of one frame. If the valid byte count and EOP indicator fields are at the beginning of the cell, a one-cell latency at the switch input results. If the valid byte count and EOP indicator fields are at the end of the cell, a one-cell latency at the switch output results. If the valid byte count and EOP indicator are in the middle of a packet, a half-cell latency at the switch input and a half-cell latency at the switch output result.

The total latency is always one cell, and the location of the latency is determined by the position of the valid byte count and EOP indicator fields within the cell. The location of the latency may be chosen to suit any other design criteria.

Alternatively, every cell within a frame could be treated as a new packet (so a frame would be transmitted as up to say forty one-cell packets). Such an approach would not substantially increase any arbitration loading within the fabric or cause blocking or congestion or an over utilization of any other fabric resources. It is generally important that the fabric retain the ordering of packets at the ingress port (without reserving as Time Division Multiplexing (TDM) connections). That is, a cell/packet and frame reordering at the egress of the fabric which would preferably be handled by a network processor at the output port. This can also necessitate packet order tagging of each cell/packet within the available header or reserved bit fields in the cell, if available such as FLOW_ID fields.

In accordance with the present invention, there is provided a cell-based switch fabric in a frame based protocol such as a Fibre Channel switch with ports that provide a minimum full-duplex bandwidth of, for example, 2.125 Gbps (200 MBps). The architecture is scalable to provide hundreds of ports and/or increase ports bandwidths up to 4 Gbps and 10 Gbps. The ability to support 10 Gbps Ethernet and InfiniBand is also possible.

Fibre Channel utilizes a variable length frame packet (36–2148 bytes), multiple classes of service with both connection (Class 1) and connectionless (Class 2,3,4) transport, reliable transport with per frame acknowledge (Class 2), and a Virtual Interface (VI) with fractional BW Quality of Service (QoS) (Class 4).

Factors of particular concern for FC Switches are:
a low transport latency (1 us<2 us) FC port to FC port, with a need for "cut-through" routing;
scalability (32->512 2 Gbps FC ports) with minimal or no physical reconfiguration or interruption of system operation;
overall reliability (fault detection and fault tolerance) and maintainability with large Mean Time Between Failures, low Mean Time To Recover, and hot-swap capability;
large input buffering capability; and
QoS service with guaranteed fractional BW capability.

The present invention permits a cell based switch to be scaled and configured to operate as 512×512 2 Gbps FC-port switch without placing restrictions on BW across channel planes. The switch cards of the cell based switch are capable of being scaled to support smaller (<256-port) switches without hardware, chassis or backplane reconfiguration.

The present invention would further provide fault detection and fault tolerance cross checks. For example, to detect bad links, chips, control. Moreover, there is provided a mechanism for reconfiguring to map around faults such as graceful degradation and/or hot-swap switch cards and port cards.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims or their equivalents.

While this invention has been particularly shown and described with references to preferred embodiments thereof, it will be understood by those skilled in the art that various changes in form and details may be made therein without departing from the scope of the invention encompassed by the appended claims.

As used herein and in the following claims, articles such as "the", "a" and "an" can connote the singular or plural.

All documents referred to herein are specifically incorporated herein by reference in their entireties.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cell-based switch, comprising:
 a. a switch input containing logic to:
  i. receive from a source an input frame containing a frame payload,
  ii. partition the frame payload among cells having the same capacity within a packet as cell payloads, at least one cell other than the last cell having a payload size less than the cell capacity, and
  iii. transmit the packet to a switch output; and
 b. a switch output containing logic to:
  i. receive each cell in the packet from the switch input, and
  ii. extract from each cell the cell payload and transmit the cell payload to a destination.

2. The switch of claim 1, wherein the switch input and the switch output require a combined buffer size not greater than the cell capacity.

3. The switch of claim 1, wherein the switch input contains further logic to include within each cell an indicator designating the cell payload size of that cell.

4. The switch of claim 1, wherein the input frame is a Fibre Channel frame and the switch output further contains logic to transmit the cell payloads from a packet to the destination within an output frame.

5. The switch of claim 1, wherein the switch is a cross-bar switch.

6. A method for transmitting a frame through a cell-based switch, comprising:
 a. obtaining a frame containing a frame payload from a source at a switch input;
 b. partitioning the frame payload among cells having the same capacity within a packet as cell payloads, at least one cell other than the last cell having a payload size less than the cell capacity;
 c. transmitting each cell to a switch output;
 d. at the switch output, extracting the cell payload from each cell and transmitting the cell payload to a destination.

7. The method of claim 6, wherein the switch input and the switch output require a combined buffer size not greater than the cell capacity.

8. The method of claim 7, further comprising:
 e. adding to each cell a size indicator designating the size of the payload of that cell before transmitting the cell to the switch output.

9. The method of claim 8, wherein the size indicator is contained in a size field located at the start of the cell.

10. The method of claim 9, further comprising:
   f. buffering each cell in a buffer at the switch input until the cell payload has been placed into the cell;
   g. setting the size indicator in the size field; and
   h. transmitting the cell to the switch output before buffering the next cell, if any.

11. The method of claim 8, wherein the size indicator is contained in a field located at the end of the cell.

12. The method of claim 11, further comprising:
   f. buffering each cell in a buffer at the switch output;
   g. extracting the size indicator from the size field;
   h. distinguishing the cell payload from unused space within the cell using the size indicator; and
   i. transmitting the cell payload to a destination before buffering the next cell, if any.

* * * * *